E. A. Goodes,
Gearing.
Nº 22,118. Patented Nov. 23, 1858.
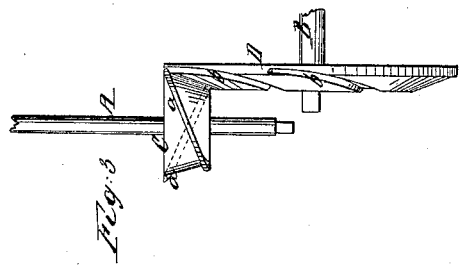
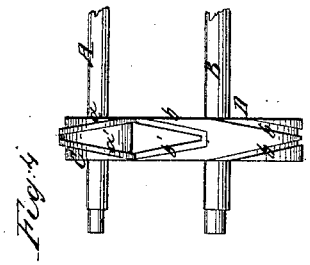
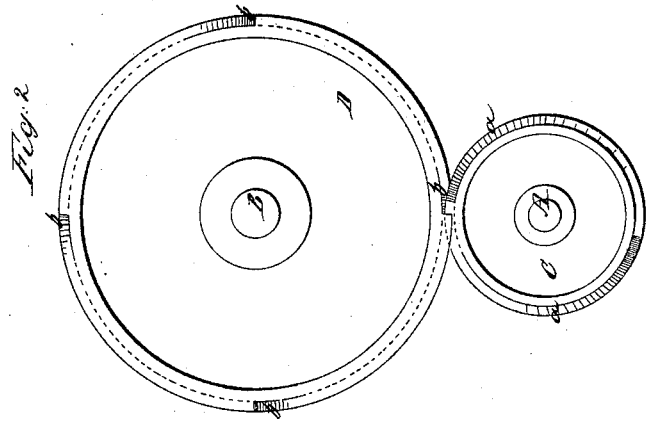
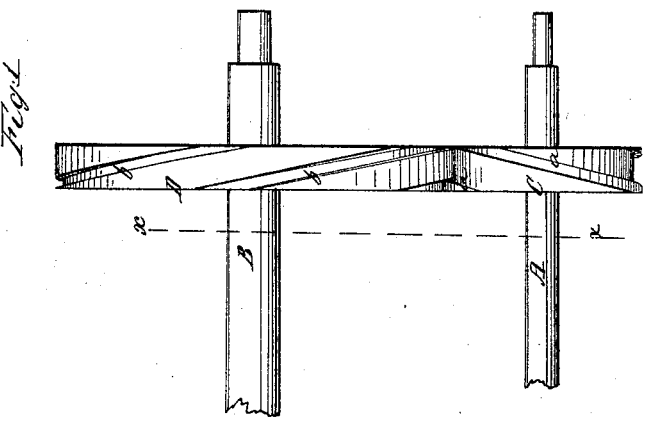

UNITED STATES PATENT OFFICE.

E. A. GOODES, OF PHILADELPHIA, PENNSYLVANIA.

GEARING.

Specification of Letters Patent No. 22,118, dated November 23, 1858.

*To all whom it may concern:*

Be it known that I, E. A. GOODES, of Philadelphia, in the county of Philadelphia and State of Pennsylvania, have invented a new and Improved Gearing; and I do hereby declare that the following is a full, clear, and exact description of the same, reference being had to the annexed drawings, making a part of this specification, in which—

Figure 1, is an end or edge view of a wheel and pinion constructed according to my invention. Fig. 2, is a side view of do. the plane of section bisecting the shafts or axles of the wheel and pinion at right angles as indicated by $x$, $x$, in Fig. 1. Figs. 3, and 4, are views showing modifications of my invention or different applications of it.

Similar letters of reference indicate corresponding parts in the several figures.

This invention is designed to supersede the ordinary cog or tooth gearing and consists in having spiral ledges or threads formed on one wheel and made to gear or work into corresponding grooves in its felly as hereinafter fully shown and described.

To enable those skilled in the art to fully understand and construct my invention I will proceed to describe it.

A, B, represent two shafts on one of which a pinion C, is placed and on the other a wheel D. The pinion C, has two spiral ledges $a$, $a$, on its periphery, said ledges being sections of screws, both of equal length and having the same pitch and placed at opposite sides of the periphery of the pinion. The wheel D, has its periphery grooved in spiral form as shown at $b$. These grooves are sections of screws corresponding with the ledges $a$, the grooves extending from one side of the periphery of the wheel to the other and made of such capacity to receive the ledges $a$, and not allow any unnecessary play. The grooves $b$, of course are equal in length to the ledges $a$, and as the wheel B, is twice as large as the pinion the number of grooves must be correspondently increased. The wheel B, therefore has four grooves, and the pinion two ledges.

From the above description it will be seen that the ledges $a$, meshing or gearing into the grooves $b$, form a perfect gear, by rotating one, motion being communicated to the other.

The advantages the within described invention possesses over the ordinary gear are as follows:—First: its cost of construction will be less although requiring to be made very true. Second: when properly constructed it will bear a much heavier application of power than the ordinary gear and the noise and jarring or rattling of the tooth gear when in operation are avoided. There will be no back lash, nothing liable to break,—as the teeth of the ordinary gearing,—but the wheels will if properly made, run smoothly and evenly with but little friction and consequently with but little wear of the working parts.

I would remark that for bevel gearing the same principle is applied as shown in Fig. 3, and that in heavy wheels, or those designed for heavy machinery where a great deal of power is applied, I prefer having two ledges $a$, $a'$, and corresponding grooves $b$, $b'$, placed respectively in reverse position relatively with each other as shown in Fig. 4. By this means there will be no lateral pressure on the bearings of the shafts. For light gearing however, the single spiral ledges and grooves will doubtless be sufficient.

Having thus described my invention what I claim as new and desire to secure by Letters Patent, is—

Providing the wheels respectively with spiral projections ($a$) and spiral grooves ($b$), substantially as and for the purposes herein shown and described.

EBENEZER A. GOODES.

Witnesses:
WM. T. TAYLOR,
EDWARD L. MILLER.